UNITED STATES PATENT OFFICE.

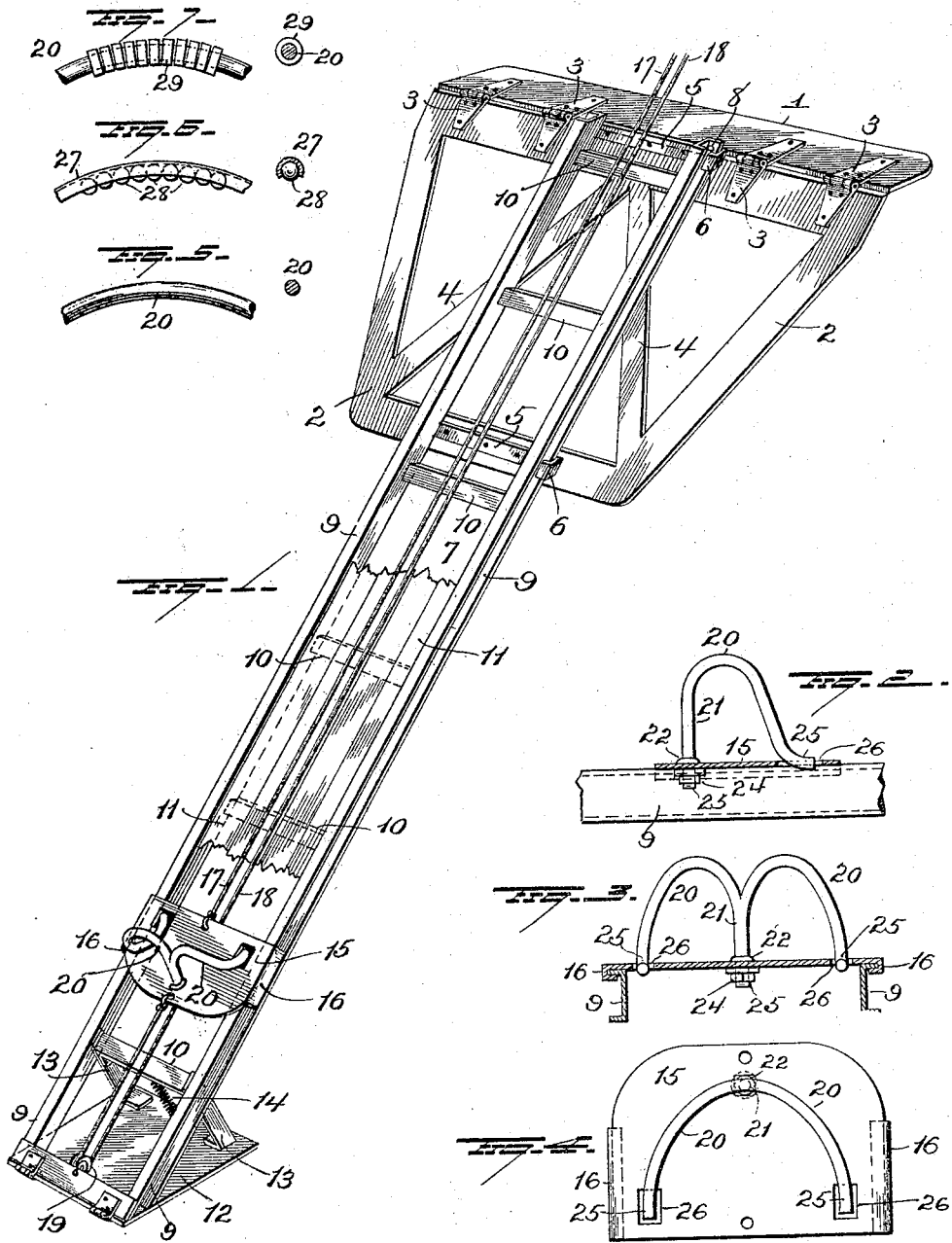

LOUIS FRITZ, OF MEMPHIS, TENNESSEE.

FISHING APPARATUS.

1,209,137.  Specification of Letters Patent.  Patented Dec. 19, 1916.

Application filed September 15, 1916. Serial No. 120,357.

*To all whom it may concern:*

Be it known that I, LOUIS FRITZ, a citizen of the United States, and a resident of Memphis, in the county of Shelby and State of Tennessee, have invented certain new and useful Improvements in Fishing Apparatus; and I do hereby declare the following to be a full, clear, and exact description of the invention, such as will enable others skilled in the art to which it appertains to make and use the same.

This invention relates to improvements in fishing apparatus and more particularly to means for facilitating the handling and hauling of fishing nets, seines and the like,— one object of the invention being to provide simple and efficient means to receive and guide the lead line of the net or seine and permit the same to be readily drawn into the boat while the webbing will be permitted to have free movement during the hauling operation.

A further object is to so construct the apparatus that the same may rest and move on the bottom of the lake or river and so that it may be connected with the lead line of the net or seine at any desired depth,— the means which receives the lead line being made movable so that it may be located at a suitable depth in the water and so that it may be drawn upwardly to the surface.

A further object is to so construct fishing apparatus that it shall form a closure for the adjacent ends of a net or seine and provide means for guiding a slide or shoe, the latter being provided with means to receive the lead line of the net or seine and guide the same without impeding the free upward movement of the webbing of the net or seine during the hauling operation.

With these and other objects in view, the invention consists in certain novel features of construction and combinations of parts as hereinafter set forth and pointed out in the claims.

In the accompanying drawings; Figure 1 is a perspective view of an apparatus embodying my improvements; Fig. 2 is a longitudinal sectional view partly broken away, through the slide or shoe; Fig. 3 is a transverse sectional view; Fig. 4 is a face view of the slide or shoe and the attaching devices carried thereby, and Figs. 5, 6 and 7 enlarged fragmentary views of different forms of hook-loop or attaching device structure.

1 represents a board or strip to be suitably secured to a boat and with the edge of this board, an apron 2 is loosely connected by means of hinges 3. The apron 2 may be made of suitable material and it may comprise an open frame suitably braced as at 4. Metal strips 5, 5 are secured to the apron 2 near its upper and lower ends and the respective ends of these strips are bent to form hooks 6 to receive and slidingly connect an elongated frame or arm 7 with said apron,— pins 8 being located near the upper ends of said arms to engage the guide hooks or loops and thus prevent escape of the upright frame or arm from the apron. The upright frame or arm is made of such length as to depend to the bottom of the lake or river, and it may comprise parallel sides 9—9 (preferably of angle-iron) connected by suitable cross braces 10, and the space between the side members 9 is closed by means of any suitable material. In the drawing, I have shown the space between the side members 9 as being closed by means of wooden strips 11 which may be suitably secured together and to said side members 9. The depending elongated frame or arm is thus adapted to constitute a closure for the adjacent ends of a net or seine when the same is connected with the apparatus as hereinafter described.

As above stated, the elongated frame or arm 7, is intended to extend to the lake or river bottom, and at its lower end, a base plate 12 is hinged thereto and extends rearwardly therefrom so as to lie and be capable of sliding on the lake bottom,—said plate being maintained in an approximately horizontal position for this purpose, by means of legs 13 secured to the side members 9 of the frame or arm 7,—against the lower ends of which legs the base plate 12 is normally pressed by means of a spring 14 secured at one end to said hinged base plate and at the other end to the lower cross brace 10. Normally, when the apparatus is in operation, the base plate 12 will be capable of moving over the bottom of the lake, but it may become slightly embedded in the mud. When the rectangular frame or arm 7 is being raised, however, the hinged base plate 12 will swing downwardly and thus slide free of any mud or other impediment which might have become deposited upon it.

The rectangular frame or arm 7 carries a slide or shoe 15 provided at its side edges with hook-shaped flanges 16 to embrace and slide freely on the upper flanges of the angle-iron side members of said rectangular frame. A rope 17 is attached to the upper edge of the slide or shoe 15 and extends upwardly to the boat for the purpose of moving said slide or shoe upwardly on the rectangular frame. A rope 18 is attached to the lower edge of the slide or shoe 12 and, after passing about a pulley 19 located at the base of the rectangular frame, is extended upwardly to the boat for moving the slide or shoe 12 downwardly.

The slide or shoe 12 carries two loop or hook-shaped attaching devices 20—20. These attaching devices may be conveniently made in a single integral structure and at their juncture, form a post 21 which passes through a central hole in the slide or shoe. This post is made with a shoulder 22 which rests on the slide and its lower end forms a threaded shank 23 which receives a lock nut 24. The attaching devices project outwardly from the slide or shoe 12 to form loops and their free ends are bent upwardly as shown at 25,—said upwardly bent ends entering openings 26 in the slide or shoe. The size of these openings relatively to the size of the ends 25 of the attaching devices is such that when the lead lines are passed through the attaching devices, the webbing of the net or seine will be permitted to pass freely between said ends 25 and the slide or shoe, and by projecting the ends 25 into the holes 26, the escape of the lead lines will be prevented.

In operating my improved apparatus the lead lines of the net or seine will be passed through the attaching devices 20 and the slide lowered on the rectangular frame 7 to the proper depth, by manipulating the ropes 17 and 18. These ropes will then be secured so as to prevent movement of the slide or shoe. In hauling the net or seine, the operator will pull upwardly on the lead lines so as to cause them to move upwardly through the outer portions of the looped attaching devices. During the upward travel of the lead lines through the looped attaching devices, those portions of the webbing attached to said lead lines will move freely between the upturned ends 25 of the attaching devices and the slide or shoe. The work of hauling the net or seine is thus greatly minimized and there will be no danger of rupturing the webbing, as free movement of the same is afforded. When the hauling of the two lead lines shall have been completed, the crotch of the net or seine will engage the post 21 of the attaching devices. The ropes 17—18 may now be unfastened and the slide or shoe moved upwardly on the rectangular frame to the boat.

The attaching devices may be made of plain rod metal as shown in Fig. 5; or to reduce friction, said devices may comprise slotted tubing 27 containing anti-friction balls 28, as shown in Fig. 6, or collars 29 may be mounted on the solid rod metal device, as illustrated in Fig. 7.

Various slight changes might be made in the details of construction without departing from the spirit thereof or limiting its scope and hence I do not wish to restrict myself to the precise details herein set forth.

Having fully described my invention what I claim as new and desire to secure by Letters-Patent, is:—

1. In a fishing apparatus, the combination with a slide and means for supporting and guiding the same, of looped attaching devices carried by said slide to receive the lead lines of a net or seine, one end of each of said attaching devices being free to permit the passage of the webbing of the net or seine between said attaching devices and the slide.

2. In a fishing apparatus, the combination with a slide and means for supporting and guiding the same, said slide having openings therein, of looped attaching devices secured to said slide and having upturned free ends entering said openings in the slide.

3. In a fishing apparatus, the combination with a rectangular frame and means for connecting the same with a boat, of a slide movable on said frame, looped attaching devices carried by said slide and each having one end free and disposed adjacent to the slide, and means for operating said slide.

4. In a fishing apparatus, the combination with a rectangular frame and means for hinging the same to a boat, of a slide movable on said frame, and having openings therein near its side edges, looped attaching devices secured to said slide and having free upturned ends disposed in said openings free of the walls thereof, and means for operating said slide.

5. In a fishing apparatus, the combination with an apron, and means for hinging the same to a boat, of a rectangular frame removably connected to said apron, a slide movable on said frame, means for operating said slide, and attaching devices carried by said slide, each of said attaching devices having one end free.

6. In a fishing apparatus, the combination with a hinged apron, of a rectangular frame attached thereto, a base plate hinged to the lower end of said frame, legs on the frame constituting stops for said base plate, means for pressing the base plate against said legs, a slide movable on said frame, means for operating said slide, and attaching devices carried by said slide.

In testimony whereof, I have signed this specification in the presence of two subscribing witnesses.

LOUIS FRITZ.

Witnesses:
R. S. FERGUSON,
CHAS. H. CLARK, Jr.

Copies of this patent may be obtained for five cents each, by addressing the "Commissioner of Patents, Washington, D. C."